US009061375B2

(12) United States Patent
Qi et al.

(10) Patent No.: US 9,061,375 B2
(45) Date of Patent: Jun. 23, 2015

(54) METHODS FOR TREATING SUPERALLOY ARTICLES, AND RELATED REPAIR PROCESSES

(75) Inventors: Huan Qi, Niskayuna, NY (US);
Bhupendra Kumar Gupta, Cincinnati, OH (US); Marshall Gordon Jones, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1249 days.

(21) Appl. No.: 12/645,501

(22) Filed: Dec. 23, 2009

(65) Prior Publication Data

US 2011/0168679 A1    Jul. 14, 2011

(51) Int. Cl.
*B23K 26/00* (2014.01)
*B23K 26/36* (2014.01)
*F01D 5/00* (2006.01)

(52) U.S. Cl.
CPC ........... *B23K 26/36* (2013.01); *B23K 2201/001* (2013.01); *F01D 5/005* (2013.01); *F05D 2230/13* (2013.01); *F05D 2230/90* (2013.01)

(58) Field of Classification Search
USPC ................ 29/889.1, 402.02, 402.06, 402.07, 29/402.13, 402.16; 219/121.69, 121.72
See application file for complete search history.

(56) References Cited

U.S. PATENT DOCUMENTS

| | | | |
|---|---|---|---|
| 5,419,971 A | 5/1995 | Skelly et al. | |
| 5,685,917 A | 11/1997 | Sangeeta | |
| 5,719,369 A * | 2/1998 | White et al. | 219/121.46 |
| 5,736,709 A * | 4/1998 | Neiheisel | 219/121.61 |
| 6,077,615 A * | 6/2000 | Yada et al. | 428/544 |
| 6,416,589 B1 | 7/2002 | Lipkin et al. | |
| 6,491,207 B1 | 12/2002 | Smashey et al. | |

(Continued)

FOREIGN PATENT DOCUMENTS

| | | |
|---|---|---|
| EP | 1247003 | 11/2004 |
| JP | 08206869 A | 8/1996 |

(Continued)

OTHER PUBLICATIONS

J. P. Nilaya et al., "Dependence of Laser Assisted cleaning of Clad Surfaces on the Laser Fluence," Laser and Plasma Technology Division, Bhabha Atomic Research Center, pp. 1-7.

(Continued)

*Primary Examiner* — Matthew W Such
*Assistant Examiner* — Ali Naraghi
(74) *Attorney, Agent, or Firm* — Francis T. Coppa

(57) ABSTRACT

A method is described, for treating a superalloy substrate which includes at least one cavity containing adherent metal oxide material on its surface. A short-pulsed, high repetition rate laser beam is directed against the cavity surface for a period of time sufficient to remove substantially all of the adherent metal oxide material. The laser beam is characterized by a peak power density in the range of about 10 megawatts/cm$^2$ to about 10 gigawatts/cm$^2$. In another embodiment, a high-power, short-pulsed, high repetition rate laser beam is directed to a region on the substrate which includes the cavity, under laser operational conditions which are capable of cutting into the superalloy material; so that a boundary region is formed within the substrate, which encloses the cavity. The cavity can be a crack in a turbine blade, and the crack can be repaired after treatment, by welding, or by another suitable technique.

30 Claims, 3 Drawing Sheets

(56) References Cited

U.S. PATENT DOCUMENTS

| | | | |
|---|---|---|---|
| 6,500,269 B2 | 12/2002 | Risbeck et al. | |
| 6,759,627 B2 | 7/2004 | Kilburn | |
| 6,998,568 B2 | 2/2006 | Brehm et al. | |
| 7,022,938 B2 | 4/2006 | Tamura et al. | |
| 7,528,342 B2 | 5/2009 | Deshi | |
| 7,529,010 B1 | 5/2009 | Scaggs et al. | |
| 7,793,399 B2* | 9/2010 | Matsuyama et al. | 29/402.08 |
| 2002/0066770 A1* | 6/2002 | James et al. | 228/119 |
| 2002/0100493 A1* | 8/2002 | Kool et al. | 134/3 |
| 2005/0016641 A1* | 1/2005 | DeLuca et al. | 148/556 |
| 2005/0035086 A1 | 2/2005 | Chen et al. | |
| 2005/0067466 A1* | 3/2005 | Boegli et al. | 228/119 |
| 2007/0170150 A1* | 7/2007 | Bostanjoglo et al. | 216/62 |
| 2009/0057275 A1 | 3/2009 | Chen et al. | |

FOREIGN PATENT DOCUMENTS

| | | |
|---|---|---|
| JP | 2003053533 A | 2/2003 |
| JP | 2004510584 A | 4/2004 |
| JP | 2004183652 A | 7/2004 |
| JP | 2005061409 A | 3/2005 |
| JP | 2009056511 A | 3/2009 |
| WO | 0228587 A1 | 4/2002 |
| WO | 2007096480 | 8/2007 |

OTHER PUBLICATIONS

Y. Ito et al., "Luminescence properties of long-persistence silicate phosphors," Elsevier, Journal of Alloys and Compounds, 2006, 408-412, pp. 907-910.

J.P. Nilaya et al., Laser-assisted decontamination—A wavelength dependent study, Elsevier, Applied Surface Science, vol. 254, 2008, pp. 7377-7380.

P. McMahon et al., "Characterization of Laser Micromachining of Metals," Micro and Nanotechnology Materials, Processes, Packaging and systems II, Proceeding of SPIE, vol. 5650, 2005, pp. 209-218.

J. Maijer, "Laser beam machining (LBM), state of the art and new opportunities," Elsevier, Journal of Materials Processing Technology, vol. 149, 2004, pp. 2-17.

R. Oltra et al., "Modelling and diagnostic of pulsed laser cleaning of oxidized metallic surfaces," Elsevier Science, Applied Surface Science, 96-98, 1996, pp. 484-490.

Japanese Office Action issued in connection with corresponding JP Application No. 2010-278692 on Nov. 4, 2014 (without translation).

* cited by examiner

METHODS FOR TREATING SUPERALLOY ARTICLES, AND RELATED REPAIR PROCESSES

BACKGROUND OF THE INVENTION

This invention relates generally to metals and metal alloys used in high temperature applications. In some specific embodiments, it relates to methods for treating superalloy components to prepare them for additional repair processes.

Superalloys are often the materials of choice for components intended for high-temperature environments. As an example, turbine blades and other parts of turbine engines (e.g., gas turbine engines) are often formed of nickel-based superalloys because they need to maintain their integrity at temperatures of at least about 1000° C.-1150° C. Protective coatings, often referred to as thermal barrier coatings or "TBC"s, effectively increase the operating temperature of turbine components by maintaining or reducing the surface temperature of the alloys used to form the various engine components.

It is common for gas turbine engine components to develop cracks, over the course of their operation. In many cases, the cracks originate on the surface of the component, and extend into the component. These cracks primarily arise over time, from extreme temperatures and pressures experienced by the turbine engines. Of particular concern are cracks which form in turbine engine blades, e.g., the high pressure turbine (HPT) blades closest to the engine combustor. These blades are subjected to the hottest combustion gases from which energy is extracted, and are most often formed from the nickel (Ni) superalloys. (These specialized alloys tend to produce equiaxed, directionally-solidified, and single crystal alloy structures).

FIG. 1 illustrates an exemplary turbine blade 10, for use in power generating turbines, e.g., the first row of blades of a gas or combustion turbine. Turbine blade 10 includes a blade root 12, an airfoil portion 14, and a tip portion 16. The blade root 12 is designed to be inserted into and retained by a disc on a rotating shaft (not shown) of the turbine. Airfoil portion 14 is shaped to extract energy from combustion gases passing over the airfoil portion 14, thereby imparting rotating mechanical energy to the turbine shaft. For modern gas turbine engines, airfoil portion 14 is designed to include one or more cooling passages formed below the surface of the airfoil for the passage of cooling air necessary to insure the integrity of the blade material in the hot combustion gas environment.

FIG. 1 provides an illustration of one of the cracks 24 that can develop near the tip 16 of the blade 10. As alluded to previously, the cracks can develop due to low cycle fatigue stresses imparted on the blade tip 16 during the operation of the turbine. If the crack 24 extends beyond a critical dimension, the turbine blade 10 must be removed from service and/or repaired, in order to prevent failure of the blade and turbine.

In many instances, the crack may be repaired by removing the material adjacent to the crack 24, to form a crack repair volume, and then filling the crack repair volume with weld metal. In general, a number of techniques are used to repair cracks. Several prominent examples include welding, diffusion brazing, activated diffusion healing (ADH), and thermal spray techniques, such as high velocity oxy-fuel (HVOF).

For most of these techniques, the initial preparation of the repair surface is critical. The undesirable presence of chemically-stable oxides, as well as any metallic bond-coat or ceramic thermal barrier coating material, can greatly impede welding or brazing of a repair surface. Thus, such materials must be completely removed, to allow for treatment, e.g., to allow for successful turbine overhaul.

Various methods have been used in the past to clean the repair surfaces of metal components like turbine blades. In some instances, manual grinding is carried out, prior to repair by welding techniques. While the grinding techniques are useful in many situations, they are also time-consuming. Moreover, the effectiveness of the grinding is very dependent on the skill of the operator. Furthermore, in the case of cracks within turbine airfoil surfaces, grinding procedures are often limited to a crack depth of about 0.35 inch (8.9 mm). Thus, deep cracks in components like HPT blades cannot always be successfully "prepped" for repair; and attempts to carry out the preparation process can sometimes result in "weld drop".

Various fluoride ion cleaning (FIC) techniques have also been used to clean cracks and other cavity surfaces. (Some of the related techniques are referred to as the "Dayton Process"). The FIC processes usually rely on the thermal decomposition of a fluorine-based polymer such as polytetrafluoroethylene (PTFE). According to some mechanisms, the resulting carbon-fluoride monomers combine with hydrogen, and these products contact various oxide deposits, converting the deposits to fluoride compounds. The fluoride compounds are volatile, and leave the cavity area in a gas stream. Heating steps are often used to transform any remaining surface deposits and diffused deposits to volatile products which can be removed in gas form.

While fluoride ion cleaning and etching processes are effective in some situations, they also may exhibit significant disadvantages. As an example, these techniques can require relatively long process times if the workpiece surface is to be completely cleaned. They may also require high cleaning temperatures, e.g., about 1900° F. (1038° C.). Moreover, FIC processes often rely on the use of compounds such as hydrogen fluoride. These materials are corrosive and toxic, and require special handling and disposal procedures. Some of the compounds are also classified as hazardous air pollutants. Furthermore, the FIC process can attack the materials which form protective coatings on superalloy articles, e.g., nickel-aluminide or platinum-aluminide materials. Thus, care must be taken to mask or otherwise protect substrate areas where these protective coatings must be retained, e.g., areas away from the specific repair region.

Accordingly, new techniques for cleaning cavities and other regions in superalloy substrates would be welcome in the art. The techniques should be effective in removing oxides and other contaminants from the cavity region, as well as removing any protective coating materials, in preparation for repair processes. Moreover, the techniques should be capable of being carried out in a relatively short time period, and at ambient temperature. They should also minimize or eliminate the need for chemicals which are hazardous and require special safety procedures.

BRIEF DESCRIPTION OF THE INVENTION

One embodiment of the present invention is directed to a method for treating a superalloy substrate which includes at least one cavity (such as a crack) containing adherent metal oxide material on its surface. The method comprises the step of directing a short-pulsed, high repetition rate laser beam against the cavity surface for a period of time sufficient to remove substantially all of the adherent metal oxide material, wherein the laser beam is characterized by a peak power density in the range of about 10 megawatts/cm$^2$ to about 10 gigawatts/cm$^2$.

Another embodiment relates to a method for treating a superalloy substrate which includes at least one cavity. This embodiment comprises the step of directing a high-power (average power), short-pulsed, high repetition rate laser beam to a region on the substrate which includes the cavity, under laser operational conditions which are capable of cutting into the superalloy material; so that a boundary region is formed within the substrate, which encloses the cavity.

DETAILED DESCRIPTION OF THE INVENTION

Figure 1:
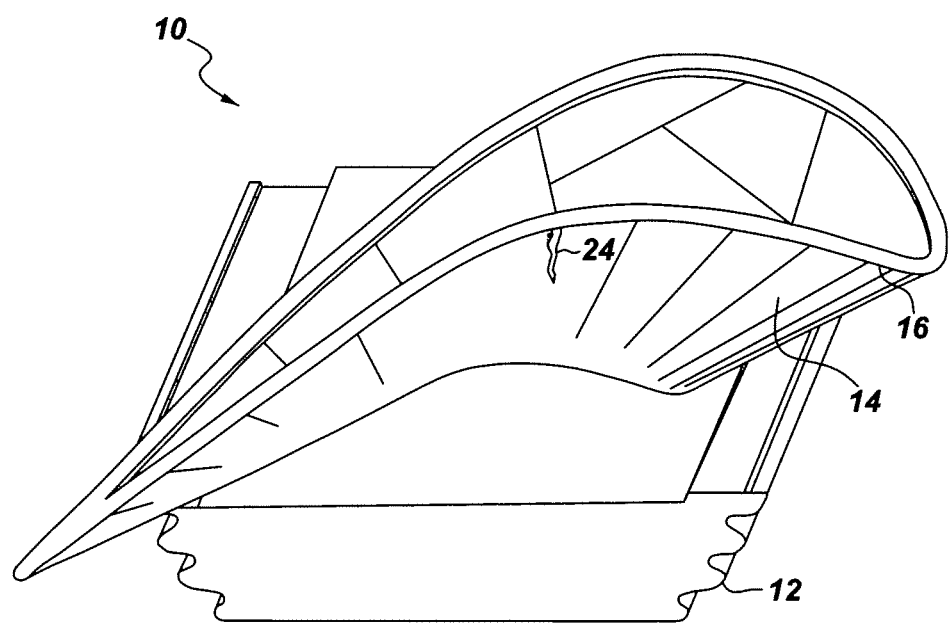
FIG. 1 is a perspective view of a turbine engine blade, including the dovetail root, airfoil portion, and tip portion.

The various compositional and process ranges disclosed herein are inclusive and combinable (e.g., ranges of "up to about 25 wt %", or, more specifically, "about 5 wt % to about 20 wt %", are inclusive of the endpoints and all intermediate values of the ranges). Moreover, the term "combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). The suffix "(s)" as used herein is intended to include both the singular and the plural of the term that it modifies, thereby including one or more of that term (e.g., "the compound" may include one or more compounds, unless otherwise specified). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

As mentioned previously, the substrate being treated is at least partially formed from a superalloy material. These materials are well-known in the art, for use in gas turbine assemblies and other high-temperature components. In general, the term "superalloy" is usually intended to embrace iron-, cobalt-, or nickel-based alloys, which include one or more other elements, including such non-limiting examples such as aluminum, tungsten, molybdenum, titanium, and iron. Superalloys exhibit desirable chemical and physical properties under the high temperature, high stress, and high-pressure conditions generally encountered during turbine operation (e.g., up to about 1,150° C.).

Superalloy-based components are often provided with important protective coatings. Examples include thermal barrier coatings (TBC's). Most TBC's are ceramic-based, such as a material like yttria-stabilized zirconia. Usually, the TBC ceramics are applied to an intervening layer which has been applied directly to the surface of the metal part. The intervening layer is often a bond layer. Bond layers are typically formed from a material like "MCrAlX", where "M" represents a metal like iron, nickel, cobalt, or combinations thereof; and "X" is an element selected from the group consisting of Y, Ta, Si, Hf, Ti, Zr, B, C, and combinations thereof.

In most instances, the protective coatings, and any byproducts formed when the coatings are exposed to various environmental conditions, need to be removed before the component is repaired, e.g., by welding. Some of the specific examples of materials which need to be removed include metal oxides, such as aluminum oxide, zirconium oxide, nickel oxide, chromium oxide, molybdenum oxide, and calcium-magnesium-aluminum-silicon oxide (CMAS). (It should be understood that terms like "nickel oxide" and "chromium oxide" are meant to include one or multiple oxide compounds, e.g., chromium (II) oxide, chromium (III) oxide, or chromium dioxide).

As described previously, the substrate includes at least one cavity. As used herein, the term "cavity" is meant to refer to any type of hole, depression, indentation, channel, or crevice. The term may also refer to various defects or irregularities on the surface of the substrate, e.g., rough areas or pitted areas. In the case of turbine components such as turbine blades, the cavity or "defect" is often a crack, such as that depicted in FIG. 1. The size of the crack which is capable of being repaired can vary significantly, e.g., from about 25 microns in depth, to about 10 mm in depth; and about 5 microns in width to about 4 mm in width (as measured in the radial direction, e.g., through the wall thickness of a turbine blade). (The wall thickness of a typical HPT blade may range from about 0.5 mm to about 2 mm).

As mentioned above, a laser is used to treat the cavity surface to remove substantially all of the adherent oxide material, according to embodiments of this invention. A variety of types of lasers can be used for this process. Non-limiting examples include solid-state lasers (e.g., diode lasers), fiber lasers, and excimer lasers. (Fiber lasers can sometimes be considered to be a type of solid-state laser). Those skilled in the art are familiar with the operation of each of these types of lasers. Solid state lasers with relatively short pulses are often preferred. Specific examples include 1-micron lasers or green lasers (0.532 microns), although the wavelength could vary from near-infrared to ultraviolet. Techniques for adjusting the wavelength of the laser are also known in the art, e.g., using "frequency-doublers" or doubling crystals.

In preferred embodiments, the laser must be capable of providing a short-pulsed, high repetition rate beam against the surface of the cavity. The pulse length is usually in the range of about 1 nanosecond to about 1 microsecond. However, lasers in the femtosecond and picosecond pulse ranges can sometimes be used. (Those skilled in the art understand that a decrease in the pulse length, at approximately the same energy level, typically results in a higher laser power value). In general, use of the shorter pulse lengths results in less melting and evaporation of the substrate surface material, and often, a smoother treated surface. However, in some cases, the short pulse length can slow down the overall cleaning process. In some preferred embodiments when treating cracks in turbine blade tips, the pulse length is often in the range of about 1 nanosecond to about 20 nanoseconds.

The repetition rate of the laser beam (i.e., the number of pulses emitted per second) can be adjusted as a function of the average power for a particular laser device. In general, the repetition rate is at least about 100 Hz, and often, in the range of about 1 kHz to about 500 kHz. In the situation where much material (e.g., oxide material) has to be removed from the cavity area, or when the material adheres tenaciously to the cavity surface, the repetition rate is sometimes selected to vary the energy-per-pulse value. Those skilled in the art will be able to select the most appropriate repetition rate, or average/peak laser power, based on various factors, such as the type of laser system employed; the laser pulse energy; the material being removed from the substrate; and the overall dimensions of the cavity.

As mentioned above, the laser beam is characterized by a peak power density which is usually in the range of about 10 megawatts/cm$^2$ to about 10 gigawatts/cm$^2$. In some specific embodiments, the peak power density is in the range of about 100 megawatts/cm$^2$ to about 10 gigawatts/cm$^2$. The average power value in this instance is usually in the range of about 1 watt to about 15 watts. Many of the factors mentioned previously will also be important here, e.g., the type and amount of material being removed from the cavity area; the depth of the cavity; and the type of laser system employed. Those of skill in the art will be able to select the most appropriate power density for a given situation.

As mentioned previously, the laser beam is directed against the cavity surface of the substrate for a time period sufficient to remove substantially all of the adherent metal oxide material. The time required to accomplish this objective will depend on the various laser operational parameters mentioned above, as well as the type and depth of material being removed from the cavity. A non-limiting illustration can be provided in the case of a nickel-based turbine blade having a V-shaped crack in its tip, with a crack depth of about 1 mm (through the wall thickness of a substrate), and a crack width in the range of about 0.5 mm to about 4 mm. In this illustration, it is assumed that the surface of the crack is covered with a layer of metal oxide material having a depth of about 0.3 mm. In that instance, for a solid state Nd:YAG green laser producing a power density of about 8 gigawatts/cm$^2$; a pulse length of about 10 nanoseconds; and a repetition rate of about 10 kHz, the required time for removal of substantially all of the metal oxide material is usually in the range of about 30 seconds to about 600 seconds.

In many preferred embodiments, the laser beam used for embodiments of this invention is focused on the cavity surface through a scanning module. Scanning modules are known in the art, and described, for example, in U.S. Pat. No. 7,528,342 (Deshi) and U.S. Pat. No. 7,529,010 (Scaggs et al), both incorporated herein by reference. In general, the "scanners" can be described as electromagnetic devices that move mirrors in pre-selected patterns (usually controlled by microprocessors), so as to reflect the laser beam and direct it to a desired point on a substrate. A variety of scanning modules can be used. Non-limiting examples include galvo scanners (sometimes referred to as "galvanometers" or "galvos") and piezo scanners. Those skilled in the art are familiar with the operation of these scanners, and their incorporation into a laser scanning system.

Figure 2:
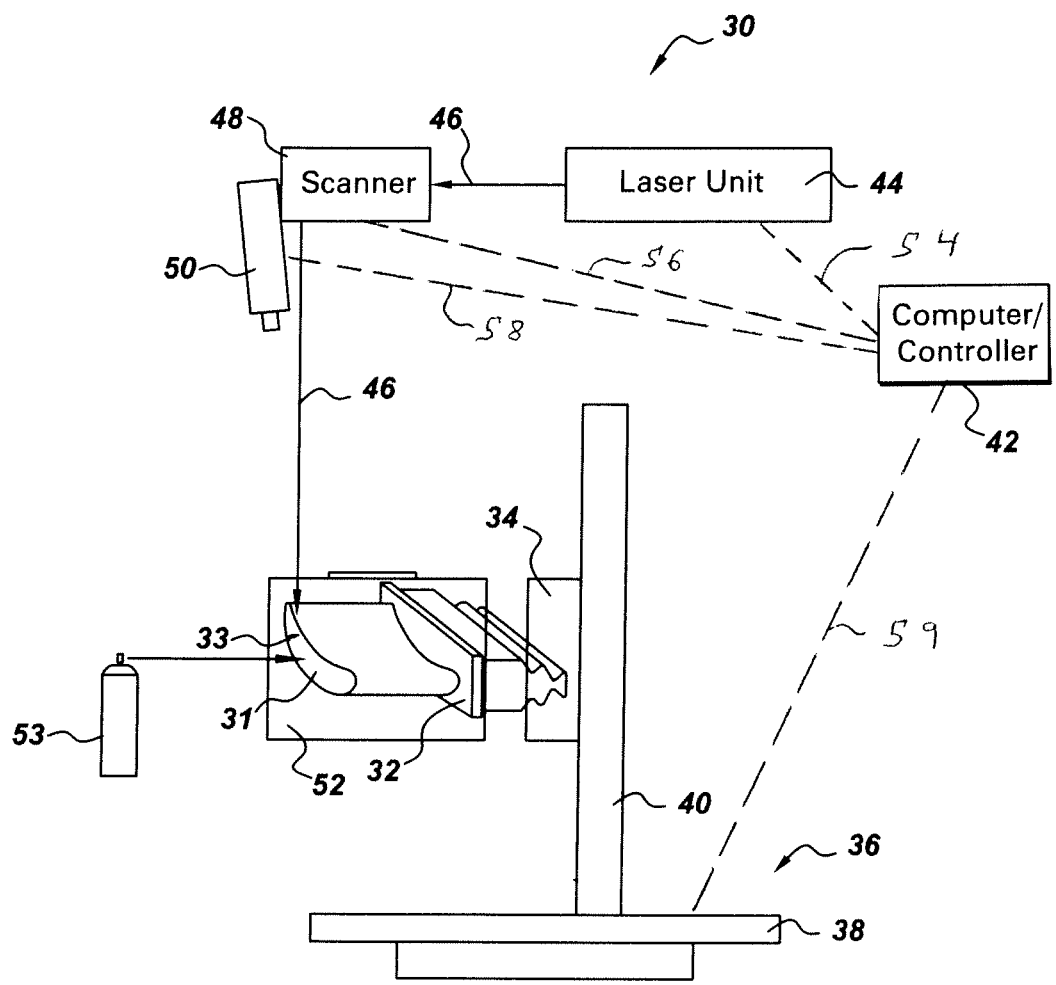
FIG. 2 is a schematic of a laser apparatus for treatment of a component according to some embodiments of this invention.

FIG. 2 is an illustrative schematic of one suitable laser apparatus 30 for embodiments of this invention. Workpiece 32, e.g., an HPT blade, is fastened securely in a clamping device or similar restraint 34. The restraint 34 is an appendage of laser support platform 36. Platform 36 typically includes a five-axis stage or table 38, and all of the details of such a table need not be depicted here. The five-axis stage is capable of mounting the workpiece 32 for three-axis (X,Y,Z) precision translation, and precision rotation (in two directions, e.g., "A" and "B") relative thereto. (It should be noted that the workpiece is exaggerated in size, for ease-of-viewing; and the relative size and position of the other components in this figure can vary considerably).

This laser support platform can advantageously be part of a complex, multi-axis computer numerically controlled (CNC) machine. These machines are known in the art, and commercially-available. The use of such a machine to manipulate a substrate is described in U.S. Pat. No. 7,351,290 of S. Rutkowski et al, which is incorporated herein by reference. As described in the Rutkowski patent, the use of such a machine allows movement of the substrate along one or more rotational axes, relative to linear axes X and Y. CNC machines of this type are commercially available from various companies, such as Haas Automation, Inc., Oxnard, Calif. Those of skill in the art can adapt such a machine for use in the present invention, without undue effort. Moreover, industrial robots may be used to coordinate movement of the laser and the support platform.

With continued reference to the illustrative apparatus of FIG. 2, the basic machine is typically provided with a five-axis controller (not shown). Platform 38 can further include a conventional elevator 40, on which a conventional rotary spindle can be mounted. The elevator 40 introduces a vertical axis (Z) of translation, relative to table 38. Moreover, another spindle or similar rotating device (not shown) can be mounted on elevator 40 to provide a second rotary axis, as described in the Rutkowski patent.

Furthermore, the overall laser apparatus 30 of FIG. 2 can also include at least one conventional, digitally-programmable computer or controller 42. Computer 42 can provide various functions relative to the laser and scanning units, but can also be configured, with appropriate software, to control all motion axes of the support platform 36. In this manner, five-axis coordination between the laser apparatus and the workpiece can be achieved. This capability in turn results in precise scanning, cleaning, and/or cutting of a desired portion of the workpiece, as further described herein.

Laser source 44 emits the desired laser beam 46, which is usually collimated, and of a linear or circular polarization state. In some instances, the laser beam incidents substantially normally on a wave plate (not shown), so as to change the polarization state of the beam. Moreover, the laser beam (i.e., laser pulse) can be modulated by a suitable beam-modulating means (also not shown). In some embodiments, one or more optical lenses can be used to expand or reduce the beam diameter.

Laser beam 46 is then scanned by a scanning module 48, as described previously. The scanning module scans the beam onto the pre-selected surface 31 of workpiece 32. (A crack 33, within surface 31, is depicted in simple form). Moreover, camera 50, e.g., a CCD camera, images the workpiece (usually through a polarizer, not shown here), to assist in aligning the workpiece to the laser beam, and to monitor the cleaning and/or cutting process. During treatment, workpiece 32 is usually sealed within a shielding enclosure 52, which is filled with inert or semi-inert gases (or forming gases such as hydrogen or hydrogen-containing mixtures), originating at gas source 53. Such an enclosure is commonly employed in the welding industry. Moreover, shown in simplistic form, the computer 42 communicates, by known mechanisms, with the laser unit, scanner, camera, and CNC platform, via conduits 54, 56, 58, and 59, respectively.

A number of other details and optional devices can be used with a laser system like that described above, or with other laser systems which can be used for this invention. Some of those details are set forth in the patents to Deshi and Scaggs et al, mentioned above, and in U.S. Pat. No. 5,419,971 (Skelly et al); U.S. Pat. No. 6,491,207 (Smashey et al); and U.S. Pat. No. 6,759,627 (Kilburn); as well as in WO 2007/096480 A1 and EP 1,247,003 B1, all of which are also incorporated herein by reference. Additional information can be found in "Laser Beam Machining (LBM), State of the Art and New Opportunities", J. Meijer, Journal of Materials Processing Technology 149 (2004), pp. 2-17; and "Modelling and Diagnostic of Pulsed Laser Cleaning of Oxidized Metallic Surfaces, R. Oltra et al, Applied Surface Science 96-98 (1996), pp. 484-490.

The process described herein is distinct from laser-generated shock wave processes, which have been employed in the art. Those processes are sometimes used to remove crust-like debris from turbine components. In contrast, the cleaning process described herein is considered to be a laser ablation process, in which the relatively high power of the laser can often result in direct vaporization of the solid material/contaminants from the substrate surface.

In some embodiments of this invention, the cavity (e.g., a crack or other defect) is repaired by filling it with a replacement material. The filler-material can be similar or identical in composition to the original material making up the substrate, modified for processing. However, other materials may be used to fill the cavity as well, depending on factors such as the intended end use of the article.

Non-limiting examples of techniques for repairing the cavity include activated diffusion healing (ADH), diffusion brazing, welding, and thermal spray techniques, such as high velocity oxy-fuel (HVOF) spraying; and combinations which include one or more of these methods. Each technique is known in the art, as are the details for using each technique to repair defects such as airfoil cracks.

Welding techniques are often preferred for repairing superalloy materials. Non-limiting examples of the welding techniques include arc welding (e.g., shielded metal arc welding, gas metal arc welding (GMAW), submerged arc welding; metal inert gas (MIG) welding, or tungsten inert gas (TIG) welding); and gas welding (e.g., oxyfuel welding). (In some instances, MIG welding and GMAW are considered to be the same technique). Those skilled in the art will be able to select the most appropriate welding technique for a particular situation, based in part on the teachings herein.

Tungsten inert gas (TIG) welding is the preferred repair technique in some embodiments of this invention. The technique is sometimes referred to by a number of other terms, such as gas tungsten arc welding (GTAW) or, sometimes, heliarc welding. TIG welding usually involves the use of a nonconsumable tungsten electrode to produce the weld. Typically, a constant-current welding power supply produces energy, which is conducted across the tungsten arc, through a column of highly-ionized gas and metal vapors, i.e., the plasma. Usually, the weld area is protected from atmospheric contamination by a shielding gas (e.g., an inert gas such as argon). TIG processes often use a filler metal.

In some embodiments of this invention, autogenous welding can be carried out, which does not require the filler material. This welding technique is usually practical if the cavity, e.g., a crack, has a width no greater than about 15% of the surrounding wall thickness. Electron-beam welding or laser welding is typically used for the autogenous processes.

A type of welding technique is particularly suitable for the materials described herein, and is known as a "SWET" process (superalloy welding at elevated temperatures). This technique, often seen as a subclass of TIG, is described in U.S. Pat. Nos. 6,996,906; 6,020,511, 6,124,568 and 6,297,474, which are incorporated herein by reference. Typically, SWET processes are performed within an enclosure in which a controlled atmosphere and temperature are maintained to inhibit cracking and oxidation of a superalloy component being repaired. Those skilled in the art are familiar with other SWET details which would be relevant to the present disclosure.

Figure 3:
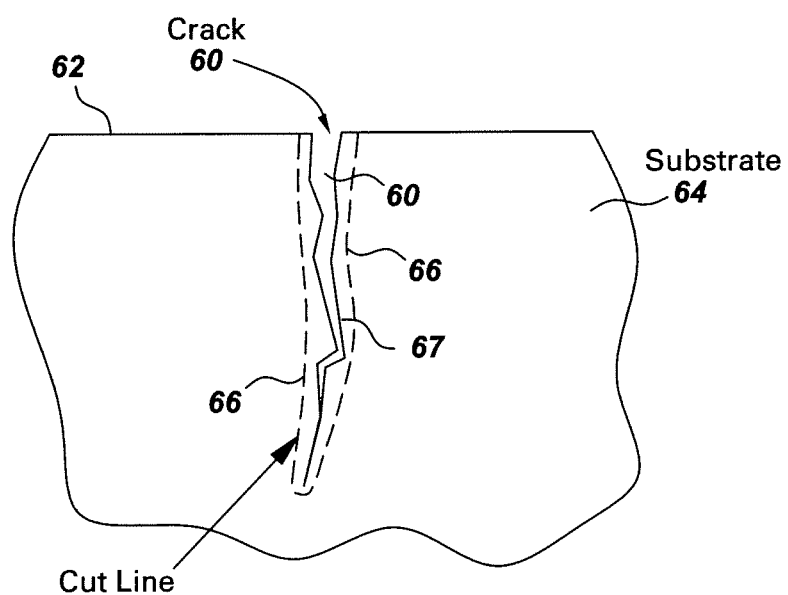
FIG. 3 is an illustration of a crack in a turbine blade, and a surrounding boundary region.

In other embodiments of this invention, a high energy laser beam is employed to cut a boundary region within the superalloy substrate. FIG. 3 is a simplified illustration of a relatively deep crack in a turbine blade, initiated from the tip of the blade, and propagated down, in the radial direction of the blade. As those skilled in the art understand, the walls and overall shape of the crack can be very irregular or jagged. The crack 60 is formed on the surface 62 of a substrate 64. A boundary region or "cut line" 66 is depicted in the figure, representing the area being cut from the substrate. (It should be understood that, despite the two-dimensional depiction of the figure, the crack and surrounding region are actually three-dimensional, so the area will sometimes be expressed herein as a "volume").

In many embodiments, cutting of the boundary region is advantageous for several reasons. First, it allows for filling of the cavity, e.g., by welding, according to precise dimensions. In this manner, the repaired cavity is characterized by "near-net shape", relative to the original shape and size of the substrate area. Thus, additional deposition and machining steps can be minimized.

Secondly, cutting of the boundary region can remove portions of the superalloy substrate which are adjacent the cavity itself. Removal of this region is sometimes desirable because surface oxide material and other impurities have diffused into the region (usually after exposure to high-heat conditions, over time). The diffused region might otherwise not be an ideal surface for subsequent repair by welding or other techniques.

The high energy laser beam used to cut the boundary region can be the same laser as that which will be used for a subsequent cleaning step. Alternatively, it can be a different laser, e.g., one of the other types described previously. The choice of a particular type of laser equipment depends in large part on the particular material from which the substrate is formed.

In some preferred embodiments, a continuous wave (CW) laser is used. The CW laser should have good "beam quality", e.g., having low beam divergence, and preferably, being highly collimated. The laser beam for this cutting step is characterized as a high-powered beam, with a peak power density in the range of about $10^6$ watts/cm$^2$ to about $10^8$ watts/cm$^2$, and more specifically, in the range of about $10^6$ watts/cm$^2$ to about $10^7$ watts/cm$^2$. In some preferred embodiments, a fiber laser, CO$^2$ laser, or a solid state laser is employed.

In other cases, a pulsed laser could be used, e.g., a short-pulsed, high repetition rate laser beam having a pulse rate ("rep rate") in the range of about 10 kHz to about 100 kHz, and an average power value in the range of about 5 watts to about 30 watts. In this instance, the peak power density would usually be in the range of 0.1 gigawatt/cm$^2$ to about 10 gigawatts/cm$^2$. Moreover, as in the case of the laser-cleaning process, the high energy laser for the cutting process can be focused on the substrate through a scanning module.

As alluded to previously, use of the laser to cut a boundary region around a crack or other type of defect or cavity has several advantages. For example, the laser can be adjusted to precisely cut a selected region of the substrate. The region is large enough to ensure removal of any oxide materials and any diffused material within the adjacent substrate region, but small enough to minimize the risk of damaging the bulk of the substrate, or drastically changing its shape. In many preferred embodiments, and with reference to FIG. 3, the boundary region 66, formed by the cut line, is relatively uniform and smooth, as compared to the inside surface or "walls" 67 of the cavity itself. (The boundary region can thus be characterized as a smooth "control volume").

After the cutting step, the cavity is usually ready for additional repair processes, such as welding. It should be noted that any oxide-type material or other contaminants that may have been present on the cavity surface have already been removed at this stage, because the cutting step removed some of the underlying substrate. However, in some cases, it may be desirable to remove any residual, free-standing superalloy material, burrs, and "spatters". A number of techniques could be used for this purpose, e.g., water-rinsing, grit-blasting, fluidized bed cleaning, and the like, or some combination of such techniques.

In some embodiments, a laser cleaning step is used at this stage, such as that described previously. This step can be especially useful for removing any additional oxide-materials that may have been formed. As an example, ambient air may have found its way into the cavity and treatment area during the cutting process, reacting with substrate constituents to form the unwanted oxides. The parameters for this laser step are generally the same as those described previously, with a pulse laser apparatus typically being used. Moreover, this "post-cutting" step can also be accompanied by other cleaning steps, e.g., the water-rinsing or grit-blasting techniques mentioned above.

At this stage, the crack or other defect has been cleaned and prepped for additional repair steps, as described previously. Moreover, the repair area has been physically defined in a precise manner, so that a near-net shape can be obtained after completion of the additional processing steps. In a typical scenario, the crack can be now filled with a desired replacement material, by a suitable technique such as welding, as described previously. The welding process, for example, results in the complete filling of the boundary region, which encompasses the crack, thereby repairing the crack.

Although this invention has been described in terms of specific embodiments, they are intended for illustration only, and should not be construed as being limiting in any way. Thus, it should be understood that modifications can be made thereto, which are within the scope of the invention and the appended claims. All of the patents, patent applications, articles, and texts which are mentioned above are incorporated herein by reference.

What is claimed:

1. A method for treating a superalloy substrate which includes at least one cavity containing adherent metal oxide material on its surface, comprising the steps of: contacting the cavity surface with a forming gas; and directing a short-pulsed, high repetition rate laser beam against the cavity surface for a period of time sufficient to remove substantially all of the adherent metal oxide material, wherein the laser beam is characterized by a peak power density in the range of about 500 megawatts/cm2 to about 10 gigawatts/cm2; sufficient to cause laser ablation of metal oxide material.

2. The method of claim 1, wherein the laser beam pulses have a pulse length of from about 1 nanosecond to about 1 microsecond.

3. The method of claim 2, wherein the laser beam pulses have a pulse length of from about 1 nanosecond to about 20 nanoseconds.

4. The method of claim 1, wherein the repetition rate of the laser beam is at least about 100 Hz.

5. The method of claim 1, wherein the source of the laser beam is a device selected from the group consisting of a solid-state laser, a fiber laser, and an excimer laser.

6. The method of claim 1, wherein the laser beam is focused on the cavity surface through a scanning module.

7. The method of claim 6, wherein the scanning module comprises a galvo scanner or a piezo scanner.

8. The method of claim 1, wherein the cavity is a crack within the superalloy substrate.

9. The method of claim 8, wherein the crack is substantially perpendicular to a surface of the superalloy substrate.

10. The method of claim 8, wherein the crack has a depth of at least about 25 microns.

11. The method of claim 10, wherein the crack has a depth in the range of about 25 microns to about 10 mm.

12. The method of claim 10, wherein the crack has a width in the range of about 5 microns to about 4 mm.

13. The method of claim 1, wherein the adherent metal oxide on the cavity surface comprises at least one material selected from the group consisting of aluminum oxide, zirconium oxide, nickel oxide, chromium oxide, molybdenum oxide, and calcium-magnesium-aluminum-silicon oxide (CMAS).

14. The method of claim 1, wherein the superalloy substrate comprises at least one metal selected from the group consisting of nickel, cobalt, and iron.

15. The method of claim 1, wherein the superalloy substrate is a turbine engine component.

16. The method of claim 15, wherein the turbine engine component is a turbine blade.

17. The method of claim 16, wherein the turbine blade includes a tip portion, and the cavity is a crack in the tip portion.

18. The method of claim 1, wherein the cavity is a crack, and said method further includes the step of repairing the crack.

19. The method of claim 18, wherein the crack is repaired by at least one technique selected from the group consisting of welding, diffusion brazing, activated diffusion healing (ADH), and a thermal spray technique.

20. The method of claim 19, wherein the welding technique is selected from the group consisting of arc welding and gas welding.

21. The method of claim 19, wherein the welding technique comprises tungsten inert gas (TIG) welding or metal inert gas (MIG) welding.

22. A method for treating a superalloy substrate which includes at least one cavity containing adherent metal oxide material on its surface, comprising the steps of: contacting the cavity surface with a forming gas; and directing a high-power, short-pulsed, high repetition rate laser beam to a region on the substrate which includes the cavity, under laser operational conditions which are capable of cutting into the superalloy material; so that a boundary region is formed within the substrate, which encloses the cavity, wherein the laser beam is characterized by a peak power density in the range of about 500 megawatts/cm$^2$ to about 10 gigawatts/cm$^2$, and is sufficient to cause laser ablation of metal oxide material.

23. The method of claim 22, wherein the laser beam is focused on the substrate through a scanning module.

24. The method of claim 22, wherein the cavity comprises walls which define its shape; and the boundary region is relatively uniform and smooth, as compared to the walls of the cavity.

25. The method of claim 22, wherein the boundary region is filled with a replacement material after being formed.

26. The method of claim 22, wherein the cavity is a crack, and the superalloy substrate is a turbine blade.

27. The method of claim 22, wherein at least one additional treatment step is carried out on the substrate prior to any cavity repair step.

28. The method of claim 27, wherein the additional treatment step comprises a laser cleaning step.

29. A method for repairing a crack in a superalloy-based surface of a turbine component, wherein the crack contains adherent metal oxide material on its surface, said method comprising the following steps: contacting the cavity surface with a forming gas: directing a high-power, short-pulsed, high repetition rate laser beam to a region on the substrate which includes the cavity, under laser operational conditions which are capable of cutting into the superalloy material and is sufficient to cause laser ablation of metal oxide material; so that a boundary region is formed within the substrate, which encloses the cavity, wherein the laser beam is characterized by a peak power density in the range of about 500 megawatts/cm2 to about 10 gigawatts/cm2; and filling the boundary region with a replacement material, by a welding technique.

30. The method of claim 29, wherein the welding technique comprises tungsten inert gas (TIG) welding).

\* \* \* \* \*